US012564990B2

(12) United States Patent
Lambæk

(10) Patent No.:  US 12,564,990 B2
(45) Date of Patent:      Mar. 3, 2026

(54) MAIN GUIDE RAIL WITH INTERNAL TRACK

(71) Applicant: LEGO A/S, Billund (DK)

(72) Inventor: Jens Stamp Lambæk, Billund (DK)

(73) Assignee: LEGO A/S, Billund (DK)

( * ) Notice: Subject to any disclaimer, the term of this patent is extended or adjusted under 35 U.S.C. 154(b) by 412 days.

(21) Appl. No.: 18/013,781

(22) PCT Filed: Jul. 6, 2021

(86) PCT No.: PCT/EP2021/068649
§ 371 (c)(1),
(2) Date: Dec. 29, 2022

(87) PCT Pub. No.: WO2022/008504
PCT Pub. Date: Jan. 13, 2022

(65) Prior Publication Data
US 2023/0241820 A1      Aug. 3, 2023

Related U.S. Application Data

(63) Continuation-in-part of application No. 17/796,987, filed as application No. PCT/EP2021/052922 on Feb. (Continued)

(30) Foreign Application Priority Data
Jul. 6, 2020    (DK) .............................. PA202070463

(51) Int. Cl.
*B29C 45/17*          (2006.01)
*B29C 45/26*          (2006.01)

(52) U.S. Cl.
CPC ...... *B29C 45/1761* (2013.01); *B29C 45/2606* (2013.01)

(58) Field of Classification Search
CPC ........................ B29C 45/1761; B29C 45/2606
See application file for complete search history.

(56) References Cited

U.S. PATENT DOCUMENTS 3,389,625 A       6/1968  Wagner
3,594,869 A  *   7/1971  Sher ...................... B29C 45/706
                                                          425/550
(Continued)

FOREIGN PATENT DOCUMENTS

CN          202985844 U      6/2013
CN          203937071 U      11/2014
(Continued)

OTHER PUBLICATIONS

CN Notice of Allowance corresponding to Application No. 17/796,987, dated Oct. 17, 2023, 5 pages.
(Continued)

*Primary Examiner* — Timothy Kennedy
(74) *Attorney, Agent, or Firm* — Day Pitney LLP; George Chaclas; Anthony A. Kassas

(57) ABSTRACT

A mold box for an injection molding machine, the mold box having a first mold plate, a second mold plate movably arranged relative to the first mold plate along a longitudinal axis, and a main guide rail system configured for guiding at least the second mold plate linearly away from and rectangular cross section perpendicular to the longitudinal axis. The main guide rail pillar extends through a third opening through a bearing arranged between the main guide rail pillar and the second mold plate. A guide track is formed as an elongate indention in a sidewall of the main guide rail pillar and has a first internal guide surface. A protruding bearing element extends from the third opening in the bearing and into the guide track.

10 Claims, 10 Drawing Sheets

Related U.S. Application Data 8, 2021, now Pat. No. 12,228,173, and a continuation-in-part of application No. 17/796,982, filed as application No. PCT/EP2021/052924 on Feb. 8, 2021.

(56) References Cited

U.S. PATENT DOCUMENTS

| | | | |
|---|---|---|---|
| 4,515,415 A | 5/1985 | Szenger | |
| 4,718,845 A | 1/1988 | Sheffield et al. | |
| 4,746,393 A | 5/1988 | Ephere et al. | |
| 4,750,876 A | 6/1988 | Lawson | |
| 4,884,962 A | 12/1989 | Sheffield | |
| 4,941,758 A | 7/1990 | Osawa | |
| 5,192,557 A * | 3/1993 | Hirata | B29C 45/1761 |
| | | | 425/589 |
| 5,547,367 A | 8/1996 | Stein | |
| 5,788,903 A | 8/1998 | Allgaier | |
| 6,203,312 B1 | 3/2001 | Romi | |
| 2003/0138513 A1 | 7/2003 | Matsuura et al. | |
| 2004/0013765 A1 | 1/2004 | Kruger et al. | |
| 2004/0076353 A1 | 4/2004 | Kubota et al. | |
| 2006/0233474 A1 | 10/2006 | Naruse et al. | |
| 2007/0172539 A1 | 7/2007 | Wang et al. | |
| 2007/0210534 A1 | 9/2007 | Thibault et al. | |
| 2009/0130244 A1 | 5/2009 | Clarke | |
| 2009/0220631 A1 | 9/2009 | Bokich | |
| 2010/0001436 A1 | 1/2010 | Axelsson | |
| 2011/0254396 A1 | 10/2011 | Evans | |
| 2012/0269917 A1 | 10/2012 | Miyatake et al. | |
| 2014/0106022 A1 | 4/2014 | Navarra | |
| 2014/0175690 A1 | 6/2014 | Sudermann | |
| 2017/0282429 A1 * | 10/2017 | Pitteloud | B29C 33/303 |
| 2018/0207848 A1 * | 7/2018 | Kung | B29C 45/1761 |

FOREIGN PATENT DOCUMENTS

| | | | |
|---|---|---|---|
| CN | 104246252 A | 12/2014 | |
| CN | 104512008 A | 4/2015 | |
| CN | 104526997 A | 4/2015 | |
| CN | 105196479 A | 12/2015 | |
| CN | 108099141 A | 6/2018 | |
| CN | 109312778 A | 2/2019 | |
| CN | 109352904 A | 2/2019 | |
| CN | 110267719 A | 9/2019 | |
| DE | 3924182 C1 | 5/1990 | |
| DE | 29614378 U1 | 11/1996 | |
| DE | 19627176 A1 | 1/1998 | |
| DE | 29802231 U1 | 4/1998 | |
| DE | 19952142 A1 | 5/2000 | |
| DE | 202004012169 U1 | 8/2005 | |
| DE | 102006046528 A | 4/2008 | |
| DE | 102011075324 A1 | 11/2012 | |
| DE | 102011080452 A1 | 2/2013 | |
| DE | 202018107023 U1 | 3/2020 | |
| EP | 0687541 A1 | 12/1995 | |
| EP | 0856391 A1 | 8/1998 | |
| EP | 1468807 A1 | 10/2004 | |
| EP | 2607044 A2 | 6/2013 | |
| FR | 2952576 A1 | 5/2011 | |
| GB | 578318 A | 6/1946 | |
| GB | 837640 A | 6/1960 | |
| GB | 2030847 A1 | 4/1980 | |
| GB | 2283936 A1 | 5/1995 | |
| JP | 8543155 A | 1/1979 | |
| JP | S543155 A | 1/1979 | |
| JP | H03239807 A | 10/1991 | |
| JP | H0524067 A | 2/1993 | |
| JP | H0646925 U | 6/1994 | |
| JP | H07156232 A | 6/1995 | |
| JP | H07246622 A2 | 9/1995 | |
| JP | H08281746 A | 10/1996 | |
| JP | H10305465 A | 11/1998 | |
| JP | 2002-321222 A2 | 11/2002 | |
| JP | 2006327131 A | 12/2006 | |
| JP | 2007130940 A | 5/2007 | |
| JP | 2010038349 A2 | 2/2010 | |
| JP | 2011-245829 A | 12/2011 | |
| JP | 2014134231 A2 | 7/2014 | |
| JP | 2018030269 A2 | 3/2018 | |
| KR | 19990025827 A | 4/1999 | |
| KR | 20070039781 A | 4/2007 | |
| WO | 2007039767 A1 | 4/2007 | |
| WO | 2007063375 A1 | 6/2007 | |

OTHER PUBLICATIONS

CN Office Action corresponding to Application No. 17/796,987, dated Sep. 14, 2023, 8 pages.

DK Search Report in Application No. PA 2020 70075, dated Jan. 2019, 4 pages.

DK Search Report in Application No. PA 2020 70076, dated Jan. 2019, 4 pages.

DK Search Report in Application No. PA 2020 70463, dated Jan. 2019, 4 pages.

International Preliminary Report on Patentability corresponding to Application No. PCT/EP2021/052924, mailed Apr. 12, 2022, 32 pages.

International Search Report in corresponding Application No. PCT/EP2021/052924, mailed May 11, 2021, 2 pages.

International Search Report in corresponding Application No. PCT/EP2021/052922, mailed May 11, 2021, 4 pages.

CN Office Action corresponding to Application No. 17/796,982, dated Oct. 11, 2023, 8 pages (translation unavailable).

* cited by examiner

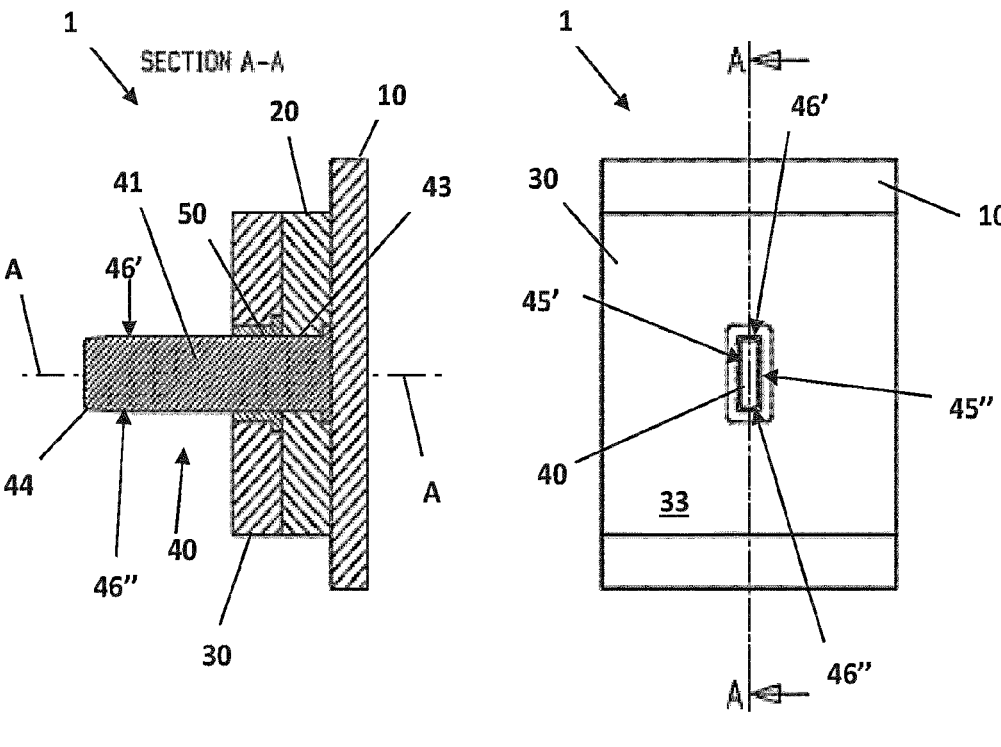
Fig. 3C
Fig. 3B
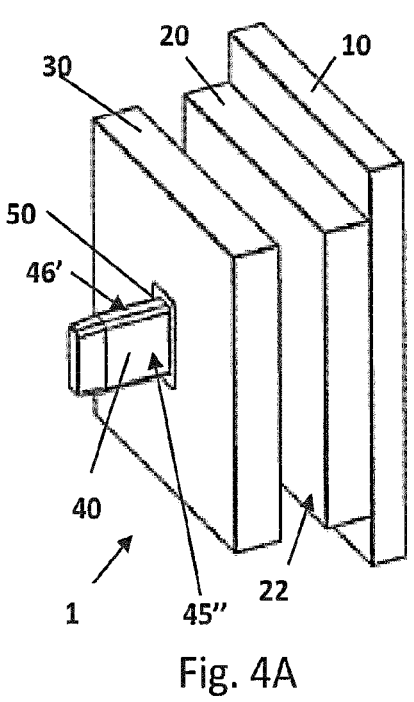
Fig. 4A

Fig. 4C                 Fig. 4B

MAIN GUIDE RAIL WITH INTERNAL TRACK

CROSS-REFERENCE TO RELATED APPLICATIONS

The present application is a U.S. National Stage Application of International Application No. PCT/EP2021/068649, filed on Jul. 6, 2021 and published on Jan. 13, 2022 as WO 2022/008504 A1, which claims the benefit and priority of Danish Patent Application No. 202070463, filed on Jul. 6, 2020, each of which is incorporated herein by reference in its entirety for any purpose whatsoever.

The present application is also a Continuation-in-Part Application of U.S. patent application Ser. No. 17/796,987, filed on Aug. 2, 2022, which is a U.S. National Stage Application of International Application No. PCT/EP2021/052922 filed on Feb. 8, 2021 and published on Aug. 12, 2021 as WO 2021/156500 A1, which claims the benefit and priority of Danish Patent Application No. 202070076, filed on Feb. 6, 2020, each of which is incorporated herein by reference in its entirety for any purpose whatsoever.

The present application is also a Continuation-in-Part Application of U.S. patent application Ser. No. 17/796,982, filed on Aug. 2, 2022, which is a U.S. National Stage Application of International Application No. PCT/EP2021/052924 filed on Feb. 8, 2021 and published on Aug. 12, 2021 as WO 2021/156501 A1, which claims the benefit and priority of Danish Patent Application No. 202070075, filed on Feb. 6, 2020, each of which is incorporated herein by reference in its entirety for any purpose whatsoever.

FIELD OF THE DISCLOSURE

The present disclosure relates to main guide rails for mold boxes for injection molding machines used in injection molding processes.

BACKGROUND

In the field of injection molding machines, having an injection unit and a clamping unit for operating a mold box, the mold box typically comprises two mold plates (also called half plates) arranged moveably relative to each other and guided by a set of guide rail, which is hereinafter referred to as main guide rails, main guide rail pillars, main guide rail system or main guide rail pillar system to distinguish from any other guide mechanisms of injection molding systems. The clamping unit further comprises a linear drive mechanism for pressing at least one of the mold plates against one or more other mold plates, during injection of molten plastic performed by the injection unit. The main guide rails are configured for supporting the mold plates, while the linear drive mechanism presses the plates together and when the mold plates are moved towards each other or away from each other.

Typically, one mold-plate is fixed relative to a frame of the injection molding machine. In typical injection molding machines, one or more mold plates is/are slideable along the set of main guide rails, which may also be referred to as main guide rail pillars. The moveable mold plates are commonly slideably translatable on four cylindrical guide rails arranged in parallel and intersecting the four corners of the square or rectangular mold plates. An actuator/linear drive mechanism drives the sliding of moveable mold-plate(s) along the set of guide rails, between a position, where the mold-plates closes to form a mold, and a position, where the mold-plates are separated from each other, so that a molded item may be removed from the mold box.

The use of a set of four cylindrical main guide rail pillars provides for making a very stable construction. It is however a disadvantage that such mold box constructions are very complicated and expensive to manufacture due to the high precision needed for making the mold-plates slide on the set of parallel guide rail pillars, driving tight tolerance demands. Further, during use, mold boxes are subject to uneven temperature distribution, causing uneven wear on the mold box parts. It is also a problem that the guide rails makes it difficult to design for auxiliary functions for example ejection pins, extraction arms etc.

In the mold boxes of clamping unit of some injection molding machines, in order to secure correct alignment of the mold plates, when the mold plates are moved together, in addition to the main guide rail pillars, it is known to provide an additional alignment or positioning system. Such as system may for example comprise a conical protrusion extending from one mold plate and a complementary conical indention formed in the opposing mold plate. When the mold plates are mowed towards each other, the interacting conical surfaces will align the mold plates. It is also known in the art, that such alignment systems comprises mating parts of other shapes. The German utility model, DE 2020 18 107 023 U1 discloses an example where the alignment system shows to beams of rectangular cross section.

SUMMARY

It is therefore an object of the disclosure to solve the disadvantages of the prior art systems, and to increase the variety of options.

In a first aspect the objects of the disclosure are achieved by a mold box for an injection molding machine, the mold box comprising
    a first mold plate;
    a second mold plate movably arranged relative to the first mold plate along a longitudinal axis; and
    a main guide rail system configured for guiding at least the second mold plate linearly away from and towards the first mold plate,
    wherein the main guide rail system comprises a main guide rail pillar having a cross section perpendicular to the longitudinal axis,
    wherein the cross-section is rectangular,
    wherein the main guide rail pillar extends through a third opening through a bearing arranged between the main guide rail pillar and the second mold plate;
    wherein a guide track is formed as an elongate indention in a sidewall of the main guide rail pillar and comprising a first internal guide surface; and
    wherein a protruding bearing element extends from the third opening formed through the bearing and into the guide track, and forming a bearing contact against the first guide surface of the guide track.

In an embodiment the rectangular shape of the main guide rail pillar is oriented such that a longer side of the rectangular shape extends vertically and a shorter side of the rectangular shape extends horizontally.

In a further embodiment, the guide track is formed in a sidewall of the main guide rail pillar which is a longer side of the rectangular shape of the cross-section of the main guide rail.

In either of the previously disclosed embodiments, the protruding bearing element may further have a length which is longer than a thickness of the second mold plate.

This will allow to increase the stiffness of the connection between the main guide rail pillar and the second mold plate along the longitudinal axis of the main guide rail pillar, and to thereby counteract torsion/rotation about an axis perpendicular to the longitudinal axis. Thereby, the risk of locking between the second mold plate and the main guide rail pillar is considerably reduced.

In embodiments hereof, the length of the protruding bearing element 0.5 to 3 times the thickness of the second mold plate Preferably, the length of the protruding bearing element is twice the thickness of the second mold plate.

In further embodiments, the protruding bearing element comprises a first roller bearing configured for rolling on said first internal guide surface of the guide track.

The first roller bearing may comprise one or more rollers, for example in the form of wheels, cylinders, balls, caterpillars or the like.

Preferably, the first internal guide surface of the guide track and the first roller bearing cooperating therewith are arranged horizontally. Thereby, the first internal guide surface of the guide track and the first roller bearing may support the vertical forces on the second main guide rail pillar from the mold plate.

In some embodiments, the protruding bearing element may further comprise a second roller bearing configured for rolling on a second internal guide surface of the guide track, wherein the second internal guide surface of the guide track is opposite to and facing the first internal guide surface of the guide track. The second roller bearing may—as the first roller bearing—comprise one or more rollers, for example in the form of wheels, cylinders, balls, caterpillars or the like.

Alternatively to the above mentioned embodiments comprising a roller bearing connection, the protruding bearing element may comprise a first external bearing surface configured for sliding against said first internal guide surface of the guide track.

Preferably, the first internal guide surface 71 of the guide track 70 and the first external bearing surface 61 are horizontally arranged. Thereby, the first internal guide surface of the guide track and the first external bearing surface may carry the vertical forces on the second mold plate.

In a further embodiment, the guide track comprises at least a second internal guide surface arranged opposite to and facing the first internal guide surface; and wherein the protruding bearing element comprises a second external bearing surface configured for sliding against said second internal guide surface of the guide track.

This provides an additional bearing contact between the main guide rail pillar and the second mold plate 30, and prevents movement between the two in the vertical direction.

In further embodiments, the bearing further comprises a first internal bearing component arranged in the third opening through the bearing, wherein the first internal bearing component is configured to cooperate with one planar guide surface of the main guide rail pillar.

Thereby an additional bearing to the bearing between the internal guide track and the protruding bearing element is provided.

In a preferred embodiment thereof, at least the first internal bearing component of the bearing cooperates with a first planar guide surface, which is arranged perpendicular to the first guide surface of the guide track. Thereby the bearing provides support in the horizontal plane perpendicular to the longitudinal direction.

In a further embodiment, the first internal bearing component comprises a first internal bearing surface configured for sliding against the planar guide surface of the main guide rail pillar. Alternatively, the first internal bearing component may comprise a roller bearing connection.

In a further embodiment the bearing further comprises a second internal bearing component arranged in the third opening through the bearing, wherein the second internal bearing component is configured to cooperate with another one of the planar guide surfaces of the main guide rail pillar, which is also perpendicular to the first guide surface of the guide track and wherein the second internal bearing component is opposite to and facing the first internal bearing component. Thereby, the main guide rail pillar is prevented against horizontal movement perpendicularly to the direction of the longitudinal axis.

In a further embodiment, the second internal bearing component comprises a second internal bearing surface configured for sliding against the second planar guide surface of the main guide rail pillar. Alternatively, the second internal bearing component may comprise a roller bearing connection.

In a further embodiment, the bearing comprises a third internal bearing component arranged in the third opening through the bearing, wherein the third internal bearing component is configured to cooperate with another one of the planar guide surfaces of the main guide rail pillar, which is parallel to the first guide surface of the guide track. This may support the bearing between the main guide rail pillar and the second mold plate in the same direction as the bearing contact between the protruding bearing element and the first guide surface of the guide track.

In a further embodiment, the third internal bearing component comprises a third internal bearing surface configured for sliding against the third planar guide surface of the main guide rail pillar. Alternatively, the third internal bearing component may comprise a roller bearing connection.

In a further embodiment, the bearing may additionally comprise a fourth internal bearing component arranged in the third opening through the bearing, wherein the fourth internal bearing component is configured to cooperate with a fourth planar guide surfaces of the main guide rail pillar, which is parallel to the third planar guide surfaces and facing in the opposite direction thereto. This may prevent movement between the main guide rail pillar and the second mold plate in the same direction as the bearing contact between the protruding bearing element and the first guide surface of the guide track.

In a further embodiment thereof, the fourth internal bearing component comprises a fourth internal bearing surface configured for sliding against the fourth planar guide surface of the main guide rail pillar. Alternatively, the fourth internal bearing component may comprise a roller bearing connection.

In a further embodiment, the main guide rail system of the mold box may comprise a first main guide rail pillar, and second main guide rail pillar, and wherein each of the first and second main guide rail pillars has a rectangular cross section perpendicular to the longitudinal axis. In a further embodiment hereof, the first main guide rail pillar extends through an opening in the second mold plate, where said opening through the second mold plate is formed centrally adjacent to an upper edge of the second mold plate, and wherein the second main guide rail pillar extends through another opening in the second mold plate, which opening is formed centrally adjacent to a lower edge of the second mold plate.

However, the main guide rail system of the mold box may alternatively comprise a single main guide rail pillar only. In this case, preferably, the single main guide rail pillar extends through a second opening in the second mold plate, which said opening through the second mold plate is formed centrally in the second mold plate.

In a second aspect the objects of the disclosure are achieved by an injection molding machine comprising a mold box according to the first aspect of the disclosure.

More particularly, in the second aspect, the objects of the disclosure are achieved by an injection molding machine comprising a mount;
a mold box according to any one of the embodiments described in respect to the first aspect of the disclosure above;
a linear drive mechanism for moving the second mold plate; and
an injection part,
wherein the second mold plate is movably arranged relative to the first mold plate, and driven by the linear drive mechanism.

It should be emphasized that the term "comprises/comprising/comprised of" when used in this specification is taken to specify the presence of stated features, integers, steps or components but does not preclude the presence or addition of one or more other features, integers, steps, components or groups thereof.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

In the following, the disclosure will be described in greater detail with reference to embodiments shown by the enclosed figures. It should be emphasized that the embodiments shown are used for example purposes only and should not be used to limit the scope of the disclosure.

FIG. 3B, in a front view, shows the mold box of FIG. 3A;

FIG. 3C, in a sectional side view, shows the mold box of FIGS. 3A and 3B;

FIG. 4A, in a perspective view, shows the mold box of FIGS. 3A-C in a second position;

FIG. 4B, in a front view, shows the mold box of FIG. 4A;

FIG. 4C, in a sectional side view, shows the mold box of FIGS. 4A and 4B;

DETAILED DESCRIPTION

Figure 1:
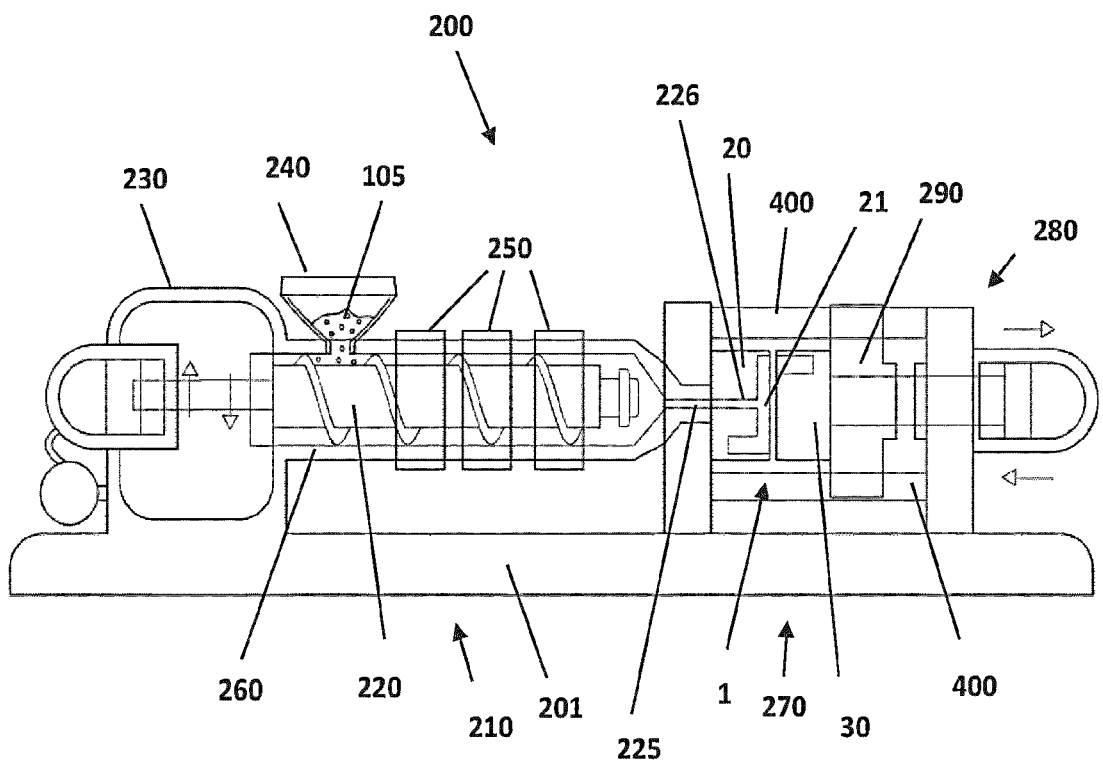
FIG. 1 schematically shows an outline of a prior art injection molding machine.

The subject technology overcomes many of the prior art problems associated with mold boxes. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

FIG. 1 illustrates schematically an injection molding machine 200 as known in the art. The injection molding machine 200 generally comprises an injection part 210, shown in the left side of the figure, and a clamping part 270, shown in the right side of the figure. The injection part 210 handles injection of plastic material into a mold formed in the clamping part 270 of the injection molding machine 200. The injection part 210 and the clamping part 270 of the injection molding machine 200 are attachable to a mount 201.

Injection molding machines 200 generally works in the following way: Plastic granules 105 are fed into the barrel 260 of a reciprocating screw 220 of the injection part 210 via a hopper 240. The reciprocating screw 220 is driven by a drive mechanism 230, such as an electrical motor. The plastic granules 105 fed through the hopper 240 are then transported towards the clamping part 270 by the reciprocal screw, while being compacted and they are heated by heating devices 250 surrounding the reciprocating screw 220, until they melt and reach a suitable viscosity at a nozzle 225 at the entrance to the clamping part 270 with the mold. The mold is formed in a mold box 1.

The fluid plastic material is fed from the nozzle 225 through sprue channels 226 in a base plate 10 of the mold box 1, and reaches a mold cavity 21 formed in a first mold plate 20 of the mold box 1. The first mold plate 20 of the mold box 1 is connected to the base plate 10. The base plate 10 is connected to the mount 201. A second mold plate 30 of the mold box 1, which may comprise a mold core and/or further portions of a mold cavity is arranged moveably relative to the first mold plate 20, such that the mold box may be completely closed (clamped together) to allow injection of the melted plastic, and such that the mold box 1 may be opened to extract a molded object 100 (see FIG. 2). The first mold plate 20 and the second mold plate 30 of a mold box 1 may also be referred to as half plates. Thus, the first mold plate 20 of a mold box 1 may also be referred to as a first half plate, and the second mold plate 30 of a mold box 1, may also be referred to as a second mold plate.

In FIG. 1 the second mold plate 30 is attached to a moveable platen 290. The moveable platen 290—and thereby the second mold plate 30—is slideably arranged on a set of cylindrical main guide rails 400. Typically, the clamping part 270 of injection molding machines 200 comprises four cylindrical main guide rails 400 for guiding the movement of the moveable platen 290 with the second mold plate 30. The movement of the moveable platen 290 with the second mold plate 30 is performed by a linear drive mechanism 280, typically a hydraulic mechanism.

The moveable platen 290 with the second mold plate 30 comprises through-going slide bearings, slideably receiving the cylindrical main guide rails 400.

In an injection process, the linear drive mechanism 280 clamps the first mold plate 20 and the second mold plate 30 together, whereupon plastic is injected from the reciprocal screw 220 through the nozzle 225 and into the mold cavity 21. When the plastic has filled the mold cavity 21 completely, and has cooled sufficiently for the plastic to be in solid state, then the linear drive mechanism 280 moves the second mold plate 30 away from the first mold plate 20, and the molded object is ejected from the mold cavity 21 in the first mold plate 20. The ejection of the molded object 100 is typically done by ejector pins (not shown) formed in/through the base plate 10.

Figure 2:
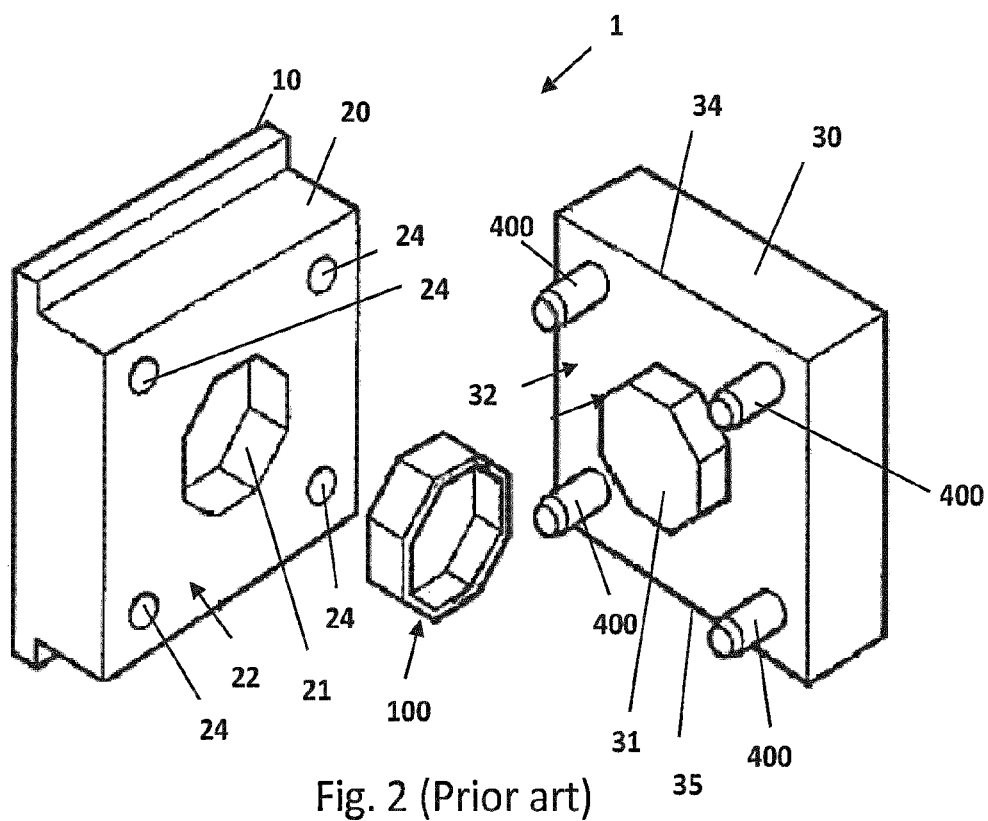
FIG. 2, in a perspective view, shows components of a prior art mold box with two half-plates and a set of cylindrical main guide rails.

FIG. 2 shows a prior art mold box 1 for an injection molding machine 200 (as outlined in FIG. 1), and a molded object 100. The mold box 1 is shown in a separated state where the molded object 100 is visible between two half plates, or mold plates 20, 30 of the mold box 1. Thus, the mold box 1 comprises two mold plates 20, 30. A first mold plate 20, here shown to comprise a mold cavity 21 of a mold, is connected to a base plate 10 of the mold box 1. The first mold plate 20 and the base plate 10 may form one integrated part, or they may be formed as separate parts and joined subsequently by suitable means, e.g. bolts. A mold cavity 21 is formed as a depression in a surface of the first mold plate 20.

The first mold plate 20 is—via the base plate 10—connected to an injection molding machine 200, e.g. as described above. The base plate 10 may thus be connected to a mount 201 as shown in FIG. 1.

A second mold plate 30 is moveably arranged relative to the first mold plate 20 and the injection molding machine 200. The second mold plate 30 is slideably arranged on a set of cylindrical main guide rails 400 of a main guide rail system configured for guiding the second mold plate 30 linearly away from and towards the first mold plate 20.

The set of cylindrical main guide rails 400 comprises four cylindrical main guide rails 400. The cylindrical main guide rails 400 are arranged to slide over bearings (not shown) provided through the second mold plate 30, or through a moveable platen 290 to which the second mold plate 30 is mounted. In FIG. 2 only a portion of the cylindrical main guide rails 400 is seen.

The cylindrical main guide rails 400 are fixedly secured in the openings 24 provided in the first mold plate 20. There is one opening 24 per main guide rail 400.

In FIG. 2 the main guide rails extend through the second mold plate 30 itself, as opposed to the version shown in FIG. 1, where the second mold plate 30 is connected to a moveable platen 290, which has bearings for the cylindrical main guide rails 400.

The second mold plate 30 is shown with a core 31 configured for mating with the mold cavity 21 in the first mold plate 20 to form a shape corresponding to the molded object 100.

Figure 5:
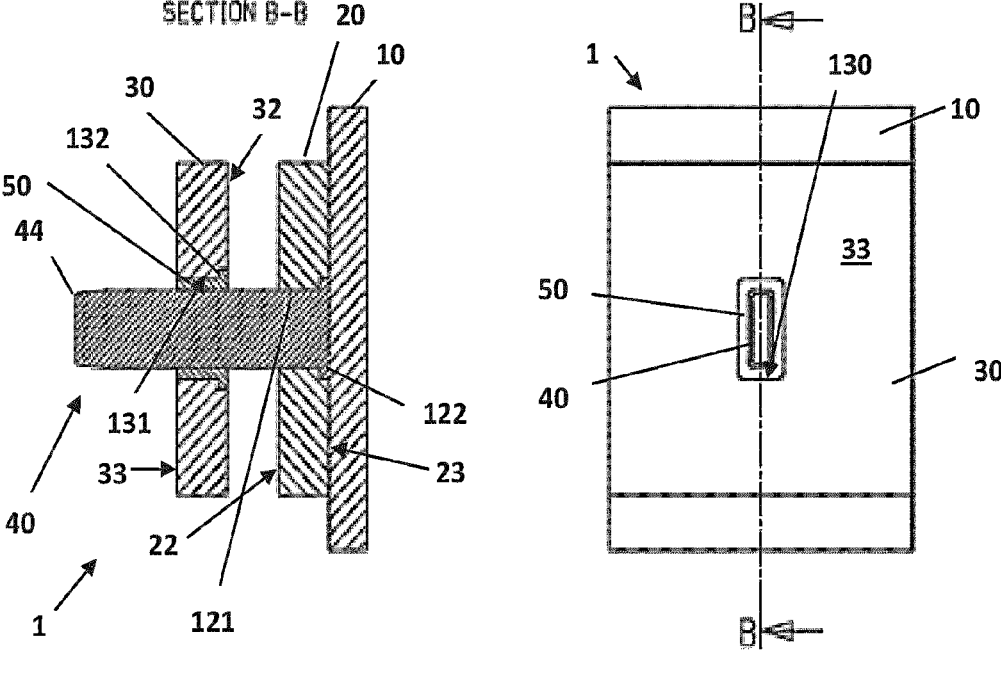
FIG. 5, in an exploded perspective view, shows the mold box of FIGS. 3A-C and 4A-C.
Figure 5:
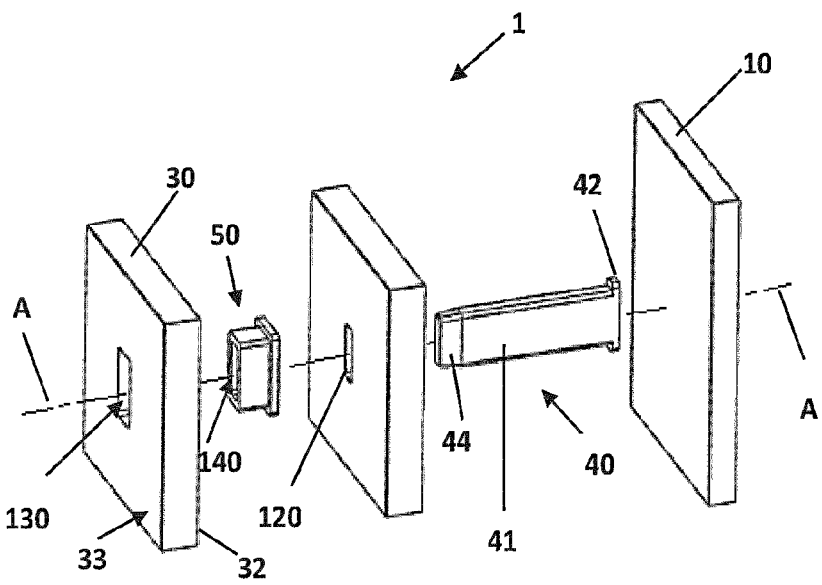

FIGS. 3-5 show a mold box 1 having a single, centrally arranged, rectangular cross section main guide rail pillar 40, instead of the set of cylindrical main guide rails 400 shown in FIGS. 1 and 2. The present disclosure relates to such a rectangular cross-section main guide rail pillar 40, which will first be described in the following, before the disclosure is described in detail further below.

The mold box 1 comprises a base plate 10 and a first mold plate 20 connected thereto. During use in injection molding processes, the first mold plate 20 is fixed in position relative to the base plate 10. The base plate 10 is fixedly connectable to an injection molding machine, e.g. as described in connection with the prior art injection molding machine 200 shown in FIG. 1. The first mold plate 20 may comprise one or more mold cavities (not shown) formed as depressions in a first surface 22 of the first mold plate 20. An opposite side, second side 23 of the first mold plate 20 faces the base plate 10, see e.g. FIG. 5.

The first mold plate 20 may be formed integrally with the base plate 10, or it may—as shown in FIGS. 3-5—be formed as individual/separate parts and subsequently be joined/connected, such that the first mold plate 20 is fixed to the base plate 10 at least during the injection molding process. The first mold plate 20 may be connected to the base plate 10 using for example bolts.

The not shown one or more mold cavities may—in also not shown—further embodiments be formed in one or more cassettes attachable on—or insertable in suitable recesses, e.g. in the first surface 22 of the first mold plate 20.

Further, the first mold plate 20 and or the base plate 10 may be equipped with sprue channels 226 and runner channels (not shown in FIGS. 3-13) necessary to connect the one or more mold cavities in the first mold plate 20 with an injection nozzle 225 of an injection molding machine 200, such as an injection molding machine as shown in FIG. 1.

The mold box 1 shown in FIGS. 3-5 further comprises a second mold plate 30.

The second mold plate 30 is movably arranged relative to the first mold plate 20. Thereby, the second mold plate 30 is also movably arranged relative to the base plate 10.

The mold box 1 as shown in FIGS. 3-5 further comprises a main guide rail system 40' configured for guiding the second mold plate 30 linearly away from and towards the first mold plate 20.

The main guide rail system 40' allows the second mold plate 30 to be movably arranged relative to the base plate 10.

In other—not shown—embodiments, the first mold plate 20 may also be movably arranged, relative to the base plate 10, the injection molding machine 200 further comprising means for moving the first mold plate 20 on the main guide rail system 40'.

In yet other—not shown—embodiments, the mold box 1 may comprise a third plate (not shown) arranged between the first mold plate 20 and the base 10, where for example runner channels are arranged in third plate. Such a third plate may be fixed relative to the base plate 10 or it may be moveable on the main guide rail system 40' in order to facilitate de-shaping of the runner channels.

As shown in FIGS. 3-5, the main guide rail system 40' comprises a single main guide rail pillar 40, only. In principle, the main guide rail system may 40' may comprise more than a single main guide rail pillar, but only one is needed.

Figure 7:
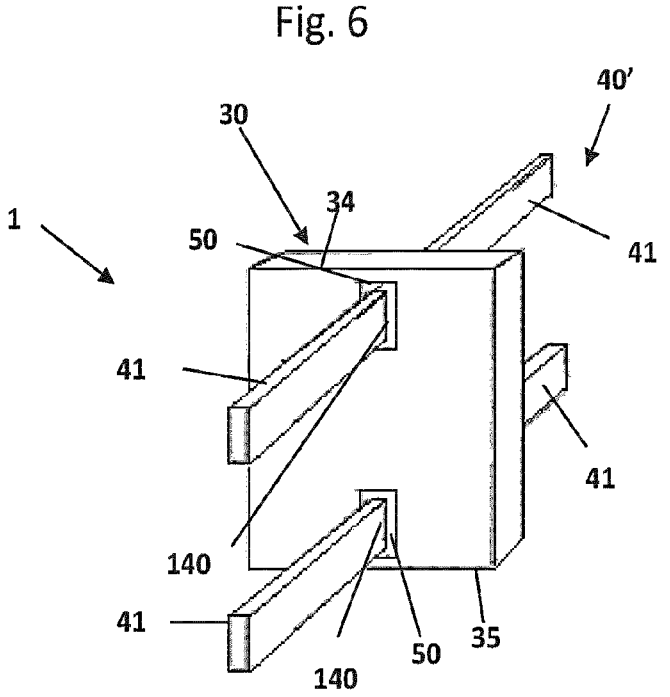
FIG. 7, in a perspective view, shows a mold box according to yet another embodiment of the disclosure.

FIG. 7 illustrates an embodiment, where the mold box 1 comprises two main guide rail pillars 40, a first main guide rail pillar 40 and a second guide pillar 40. The first main guide rail pillar 40 extends through an opening 140 formed through a bearing 50 formed in the second mold plate 30. This opening 140 through the bearing 50 of the second mold plate 30 is formed adjacent to an upper edge 34 of the second mold plate 30, and centrally along this edge 34. Further, the second main guide rail pillar 40 extends through another opening 140 through a second bearing 50 formed in the second mold plate 30. This opening 140 is formed adjacent to a lower edge 35 of the second mold plate 30, and centrally along this edge 35.

Now returning to FIGS. 3-5, the main guide rail pillar 40 is elongate, having a first end 43 and second end 44, an elongate body part 41 extending between the first end 43 and the second end 44, and a longitudinal axis A. The main guide rail pillar 40 has a cross sectional shape perpendicular to the longitudinal axis A.

The cross-section/cross-sectional shape forms a polygon.

We note that by a polygon or polygonal shape we mean any 2-dimensional shape formed with straight lines. Triangles, quadrilaterals, pentagons, and hexagons are all examples of polygons.

There are two main types of polygon—regular and irregular. A regular polygon has equal length sides with equal angles between each side. Any other polygon is an irregular polygon, which by definition has unequal length sides and unequal angles between sides. In principle, the cross-section of the guide pillar according to the disclosure may have any polygonal shape.

However, as shown in FIGS. 3-5, the polygonal shape may in preferred embodiments be rectangular or quadratic.

In some embodiments a longer side length of the rectangular cross section/cross-sectional shape may be arranged vertically. Thus, the rectangular shape of the main guide rail pillar 40 is oriented such that a longer side of the rectangular shape extends vertically and a shorter side of the rectangular shape extends horizontally.

In any case, each main guide rail pillar 40 having a cross-section/cross-sectional shape forming a polygon will result in the main guide rail pillar 40 having a set of planar guide surfaces 45',45", 46', 46" for cooperating with a bearing element 51 arranged on the second mold plate 30. The number of planar guide surfaces on the main guide rail pillar 40 will depend on the number of sides of the polygonal cross-section/cross-sectional shape of the main guide rail pillar 40. The main guide rail pillar 40 shown in FIGS. 3-5, and 6-7 having a rectangular cross section has two wider planar guide surfaces 45', 45", and two narrower planar guide surfaces 46', 46". The two wider planar guide surfaces 45', 45" are parallel to each other and formed on opposed sides of the main guide rail pillar 40. Similarly, the two narrower planar guide surfaces 46', 46" are parallel to each other and formed on opposed sides of the main guide rail pillar 40, but perpendicular to the two wider planar guide surfaces 45', 45".

The second mold plate 30 may comprise one or more mold cores 31 (not shown in FIGS. 3-13) extending outward from a first surface 32 of the second mold plate 30, facing the first surface of the first mold plate 20. An opposite side, second surface 33 of the second mold plate 30 faces away from the first mold plate 20 and the base plate 10, see e.g. FIG. 5. The second mold plate 30 is arranged moveably relative to the first mold plate 20, such that the mold box may be completely closed (clamped together) to allow injection of the melted plastic into a mold cavity formed between the first and second mold plates 20, 30, and such that the mold box 1 may be opened to extracted a molded object, e.g. similar to the molded object 100 shown in FIG. 2.

As is the case with the first mold plate 20, described above, the not shown one or more mold cores (and/or further portions of mold cavities) may—in also not shown—further embodiments be formed in one or more cassettes attachable on—or insertable in suitable recesses in e.g. the first surface 32 of the second mold plate 30.

As is the case with the prior art examples described above, the mold box 1 according to the disclosure may form part of a clamping part 270 of an injection molding machine 200, in this case however with a single polygonal cross-section main guide rail pillar 40 (instead of the four cylindrical main guide rails 400, shown in FIG. 1) for guiding the movement of the second mold plate 30. The movement of the second mold plate 30 is performed by a linear drive mechanism 280, for example a hydraulic mechanism.

As shown in FIGS. 3-13, the main guide rail pillar 40 extends through a second opening 130 in the second mold plate 30. The second opening 130 in the second mold plate 30 is a through-going opening extending all the way through the second mold plate 30.

The second opening 130 in the second mold plate 30 preferably has a cross sectional shape corresponding to the cross-sectional shape of the guide pillar 40 such that the guide pillar 40 may be slideably arranged therein.

As shown in FIGS. 3-5 and 6, the main guide rail pillar 40 also may extend through a first opening 120 in the first mold plate 20. The first opening 120 in the first mold plate 20 is a through-going opening extending all the way through the first mold plate 20. The first opening 120 in the first mold plate 20 preferably has a cross sectional shape corresponding to the cross-sectional shape of the guide pillar 40 such that the guide pillar 40 may be received and fixedly anchored.

The main guide rail pillar 40 may have a main body part 41 and flange or protrusion 42 having a larger cross sectional extent than that of the main body part 41, see e.g. FIG. 5. In such cases, and as shown in e.g. FIG. 4C, the first opening 120 in the first mold plate 20 may comprise one first section 121 configured for receiving a portion of the main body part 41 of the main guide rail pillar 40, and another, second section 122 with a larger cross-sectional extend than the first section 121, and configured for receiving the flange 42 of the main guide rail pillar 40, see e.g. FIG. 4C. The main guide rail pillar 40 at a first end 43 thereof may thereby be provided with a protrusion 41 configured for cooperating with an enlargement 121 of the second opening 120 in the first mold plate 20. Thereby, the main guide rail pillar 40 may be anchored in first opening 120 through the first mold plate 20.

In either case, and as shown in FIGS. 3-5 the second opening 130 in the second mold plate 30 is formed centrally in the second mold plate 30. In this case, it follows that the first opening 120 in the first mold plate 20 is also formed centrally in the first mold plate 20.

Figure 6:
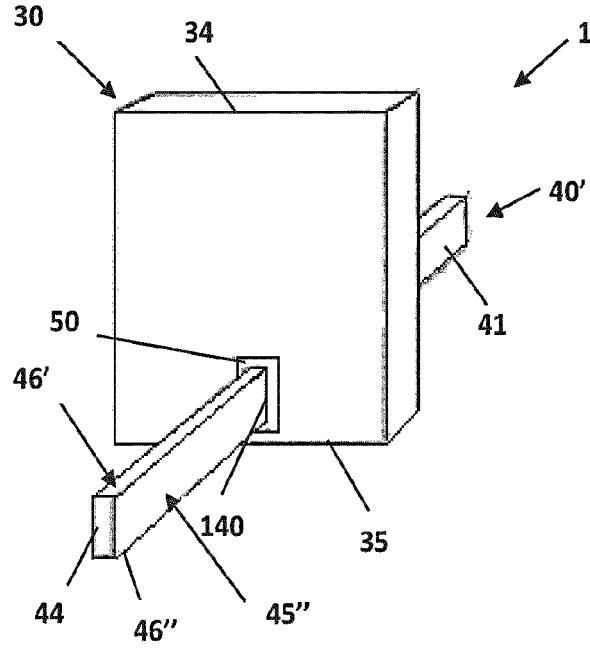
FIG. 6, in a perspective view, shows a mold box with a single rectangular main guide rail pillar, where the main guide rail pillar is offset relative to the center of the half-plates of the mold box.

In other embodiments, and as illustrated in FIG. 6, a single main guide rail may not necessarily have to be arranged through a centrally located opening 120, 130 in each mold plate 20, 30. FIG. 6 illustrates an embodiment, where a single main guide rail pillar 40 is arranged through a second opening 130 in the second mold plate 30, which is located adjacent to a lower edge of the second mold plate 30, and centrally on the lower edge 35. It follows that in such embodiments, the first opening 120 through the first mold plate would be arranged in a similar manner (the first mold plate 20 is not shown in FIG. 6).

The one or more mold cavities may be formed around the first opening 120 in the first mold plate 20. Further, mating mold cores may be formed around the second opening in the movable, second mold plate 30.

Figure 3A:
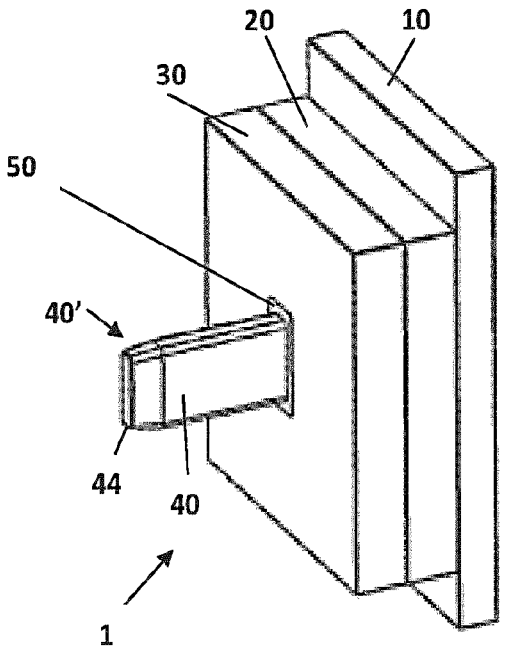
FIG. 3A, in a perspective view, shows a mold box with a single centrally arranged rectangular main guide rail pillar.

FIGS. 3A-C, in various views, show a mold box 1 according to one embodiment of the disclosure in a first position, where the first and second mold plates 20, 30 are in close contact and clamped together. This illustrates a position, where plastic may be injected into the (not shown) mold cavity formed between the first and second mold plates 20, 30. Correspondingly, FIGS. 4A-C show the mold box of FIGS. 3A-C in a second position, where the first and second mold plates 20, 30 are separated from each other. This illustrates a position, where molded objects may be removed from the mold cavity.

In either of the above mentioned cases, the second opening 130 in second mold plate 30 may, as shown, be provided with a bearing 50, such as a slide bearing. In this case the second opening 130 in the second mold plate 30 may be configured to receive the bearing 50.

The bearing 50 comprises a bearing element 51 with inner surfaces configured for contacting against the planar guide surfaces 45', 45", 46', 46" of the main guide rail pillar 40. The bearing 50 may, as shown in FIG. 5, have a main body part 51 and flange 52 having a larger cross sectional extent than that of the main body part 51. In such cases the second opening 130 in the second mold plate 30 may comprise one first section 131 configured for receiving the main body part 51 of the bearing 50, and another, second section 132 with a larger cross-sectional extend than the first section 131, and configured for receiving the flange 52 of the bearing 50, see e.g. FIG. 4C.

As shown in FIGS. 3-6, the main guide rail pillar 40 extends through a third opening 140 formed in the bearing 50. The third opening 140 in the bearing 50 is a through-going opening extending all the way through the bearing 50. The third opening 140 in the bearing 50 preferably has a cross sectional shape corresponding to the cross-sectional shape of the guide pillar 40 such that the guide pillar 40 may be may be slideably arranged therein.

In the embodiment shown in FIG. 7, having two main guide rail pillars 40, a bearing 50 as described above may be provided between each main guide rail pillar and the second mold plate 30.

One problem with such a main guide rail pillar with a polygonal cross-shape is the torsional forces between the one, two of more main guide rail pillars 40 and the second mold plate 30, and possibly further plates slideably arranged on the main guide rail pillar(s) 40. During use, torsional forces are bound to affect the moveable second mold plate 30. Such torsional forces may impart a slight tilting of the second mold plate 30 (and/or further plates) relative to the main guide rail pillar(s) 40. This will result in increased wear of the bearing 50 (between the main guide rail 40 and the mold plate 30) and/or main guide rail 40, and in some cases there is even a risk that the second mold plate 30 will become locked to the main guide rail pillar(s) 40.

Figures 13, 14:
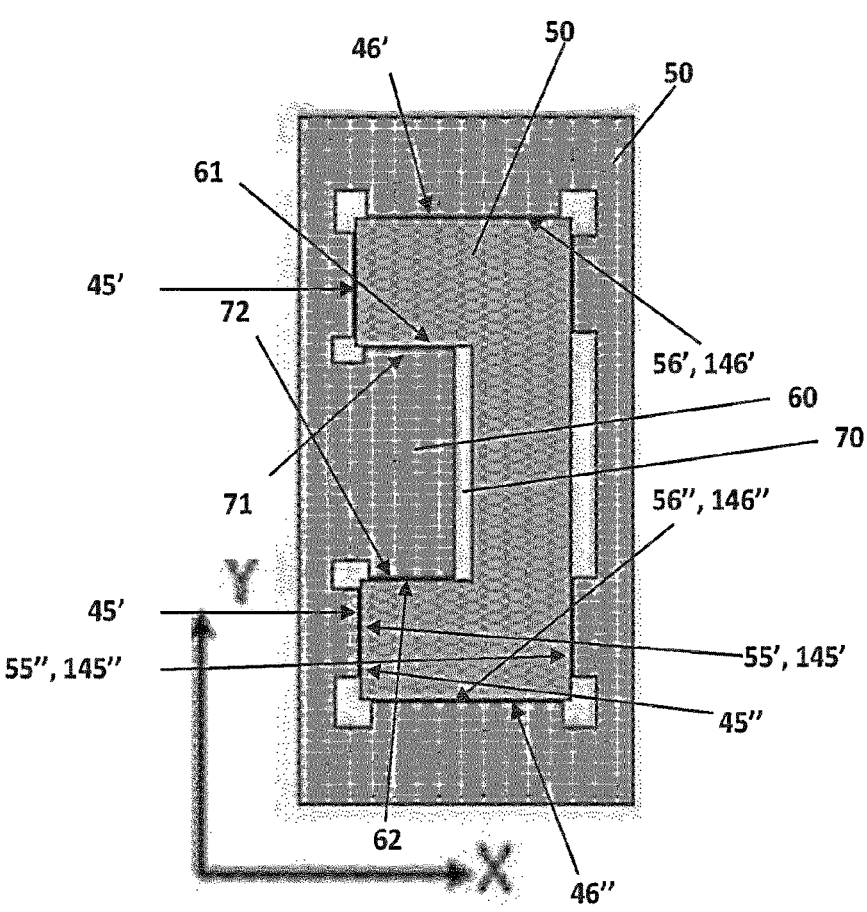
FIG. 13, in front view, shows another embodiment of the connection between a mold plate and a rectangular main guide rail pillar with an internal track.
FIG. 14 shows a principal sketch of a prior art bearing running on a main guide rail pillar to illustrate a locking effect.

Such a locking effect is illustrated in FIG. 14, in the context of a prior art cylindrical main guide rail pillar 40 with a bearing 50 slideably arranged thereon. If pressure (indicated by arrow A' in FIG. 14 is supplied to the bearing (such as through a second mold plate) at a distance D from the main guide rail pillar 40 longitudinal axis, the bearing 50 may tilt slightly relative to the main guide rail pillar 40. As indicated by arrows B' and C' such a slight torsion of the bearing 50 may cause surface portions of the bearing 50 to apply a larger pressure on the main guide rail pillar 40. i.e. it will increase the friction in the Z direction, indicated in the figure at points or locations of the bearing 50. This will increase wear on the bearing surfaces and on the main guide rail pillar 40. In some cases it may even cause the bearing 50 (and thereby the movable second mold plate 30 being locked to the main guide rail pillar 40, which is highly undesirable. This will happen when the frictional forces, in the Z-direction, between the bearing 50 and the main guide rail pillar 40 at the points/locations indicated by arrows B' and C' becomes larger than the forces A' applied in the Z direction. This may be termed a lock effect or locking effect.

In FIG. 14, such a lock effect is explained in connection with a prior art cylindrical main guide rail pillar 40. It will however be appreciated that there is a risk of a similar occurrence of a lock effect (or increased wear) in connection with the polygonal, such as rectangular, main guide rail pillars as described above.

In one aspect of the disclosure this may be overcome by the main guide rail pillar(s) 40 having a rectangular cross section with the longer side surfaces being arranged vertically, such as is shown in e.g. FIGS. 3-13, where the main guide rail pillar(s) has/have a rectangular cross section with two wider planar guide surfaces 45', 45", and two narrower planar guide surfaces 46', 46". The two wider planar guide surfaces 45', 45" are parallel to each other and formed on opposed sides of the main guide rail pillar 40. Similarly, the two narrower planar guide surfaces 46', 46" are parallel to each other and formed on opposed sides of the main guide rail pillar 40, but perpendicular to the two wider planar guide surfaces 45', 45".

However, it has shown that there may be a need for further guidance for stabilizing the movement of the second mold plate 30 or any other platen moving on the main guide rail pillar 40. A solution to this problem is shown in the FIGS. 8-13.

The embodiments shown in FIGS. 8-13 also concerns a mold box 1 for an injection molding machine, such as the injection molding machine 200 shown in FIG. 1. The mold box 1 also in this case comprises a first mold plate 20 and second mold plate 30, where at least the second mold plate 30 is movably arranged relative to the first mold plate 20 along the longitudinal axis, A, along a main guide rail system 40.

As descried above the main guide rail system is configured for guiding at least the second mold plate 30 linearly away from and towards the first mold plate 20, and the main guide rail system 40' may comprise one or more main guide rail pillar(s) 40, in the same way as described above. Also as described above, each of main guide rail pillar(s) 40 may have a cross section perpendicular to the longitudinal axis (A), which is rectangular.

Figure 10:
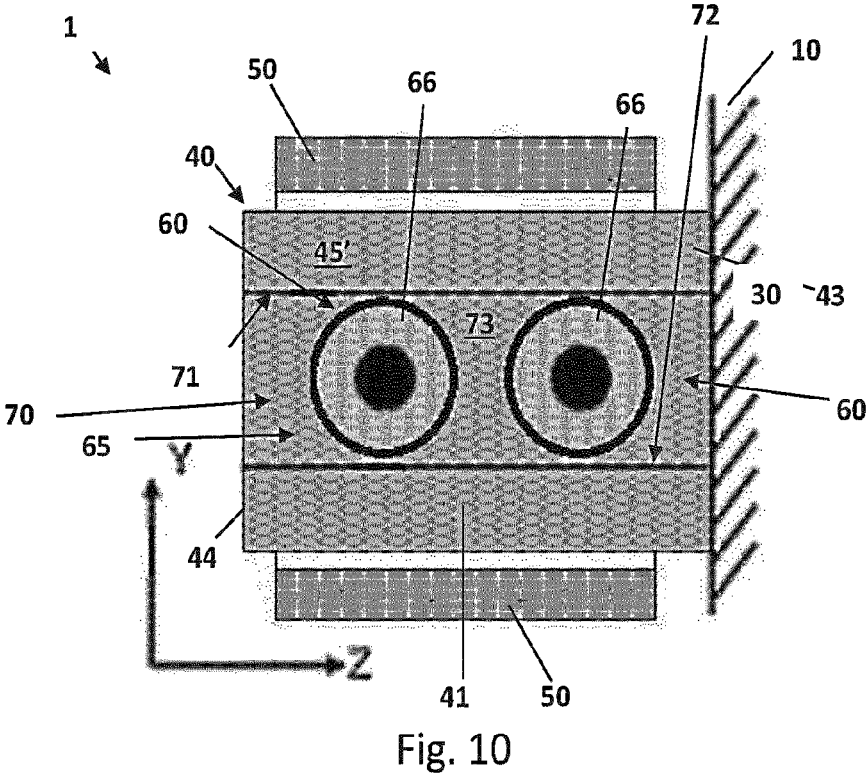
FIG. 10, in a schematic side view shows, a portion of a half plate and main guide rail pillar with an internal track according to one embodiment of the disclosure.
Figure 11:
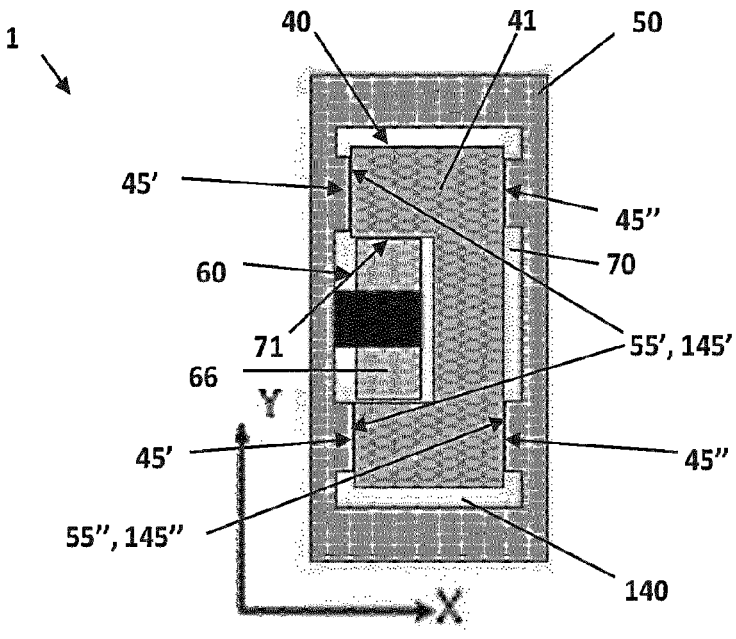
FIG. 11 shows the half plate and main guide rail pillar with an internal track of FIG. 10 in a section through the main guide rail pillar perpendicular to its longitudinal axis.

The disclosure differs from what is described above, by having a guide track 70 formed in a sidewall of the main guide rail pillar 40. The guide track 70 is formed as an elongate indention into one sidewall of the rectangular main guide rail pillar 40. The guide track 70 extends along an entire length of the main guide rail pillar 40 in the longitudinal direction, defined by the longitudinal axis, A, thereof, or at least over a distance, where the second mold plate 30 is intended to be slideably translational. The guide track 70 comprises at least one guide surface, first guide surface 71. The first guide surface 71 can be seen in FIGS. 10 and 11. FIG. 10 is a side view of the embodiment shown in FIGS. 8-9, and FIG. 11 is sectional view through the same.

Figure 8A:
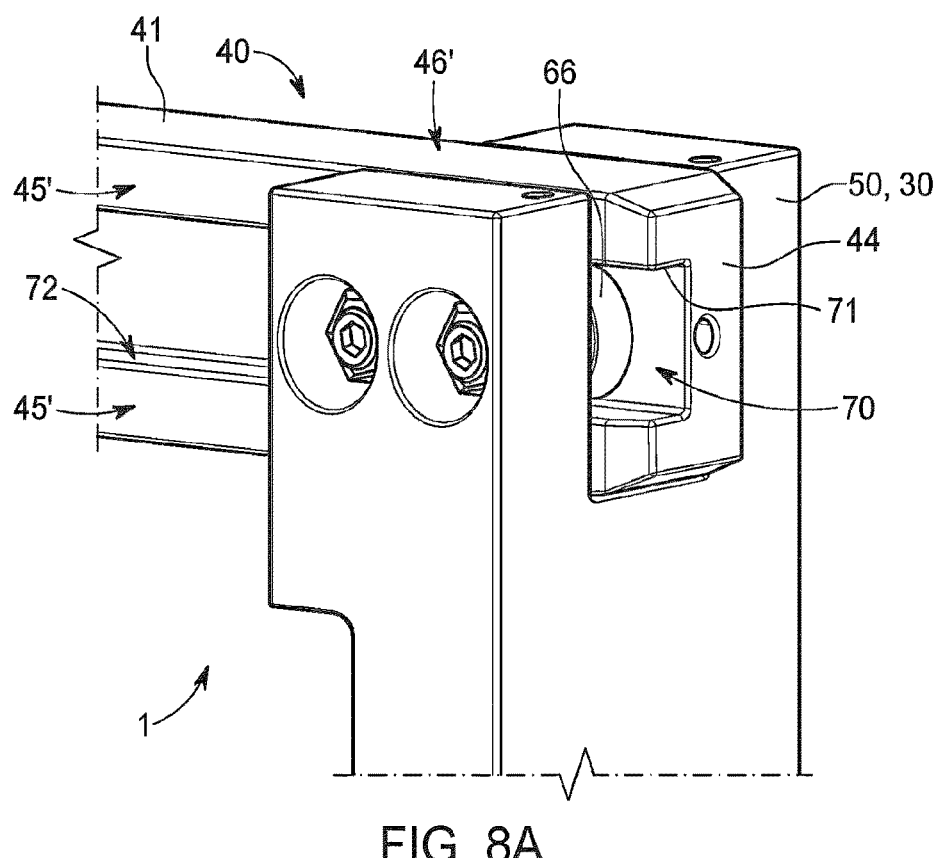
FIG. 8A, in a perspective view, shows a portion of a bearing and a half plate and a portion of a main guide rail pillar with an internal track according to one embodiment of the disclosure.
Figure 8B:
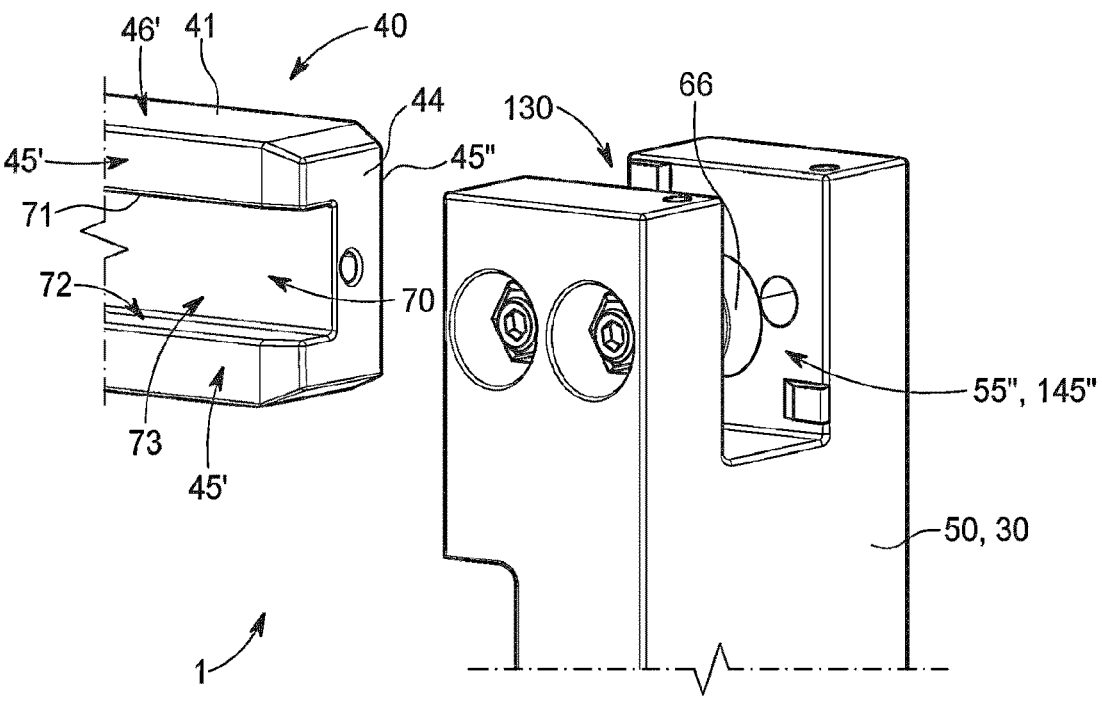
FIG. 8B, in a perspective view, shows the portion of a bearing and a half plate and a portion of a main guide rail pillar with an internal track according of FIG. 8A, in a situation where the bearing and main guide rail pillar are separated from each other.
Figure 9A:
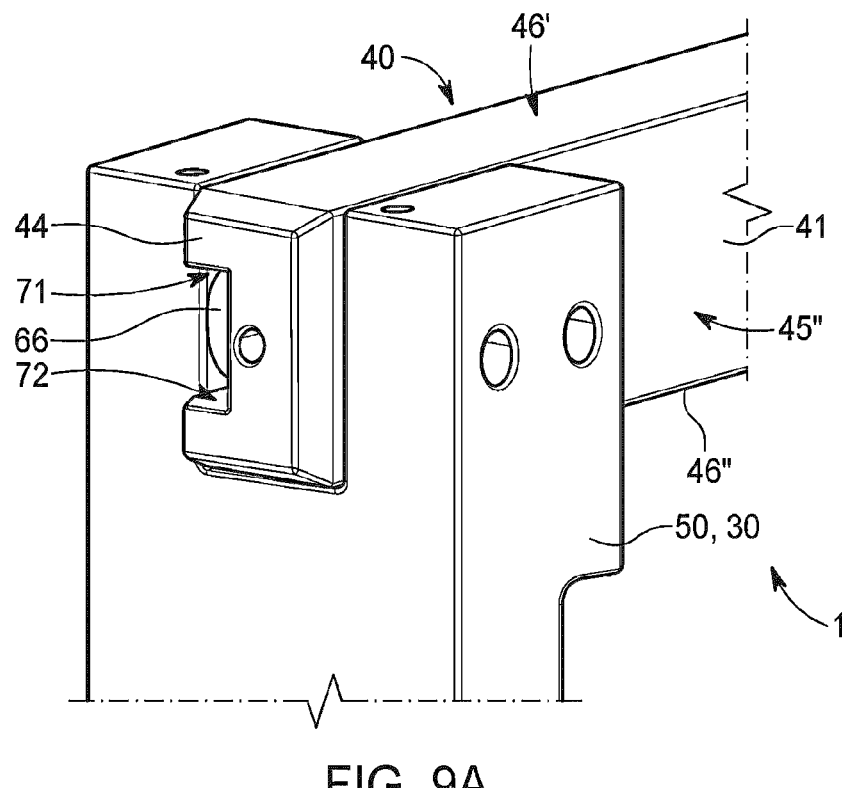
FIG. 9A, in a perspective view, shows the bearing, half plate and main guide rail pillar with an internal track of FIGS. 8A-B, seen from a different viewpoint.
Figure 9B:
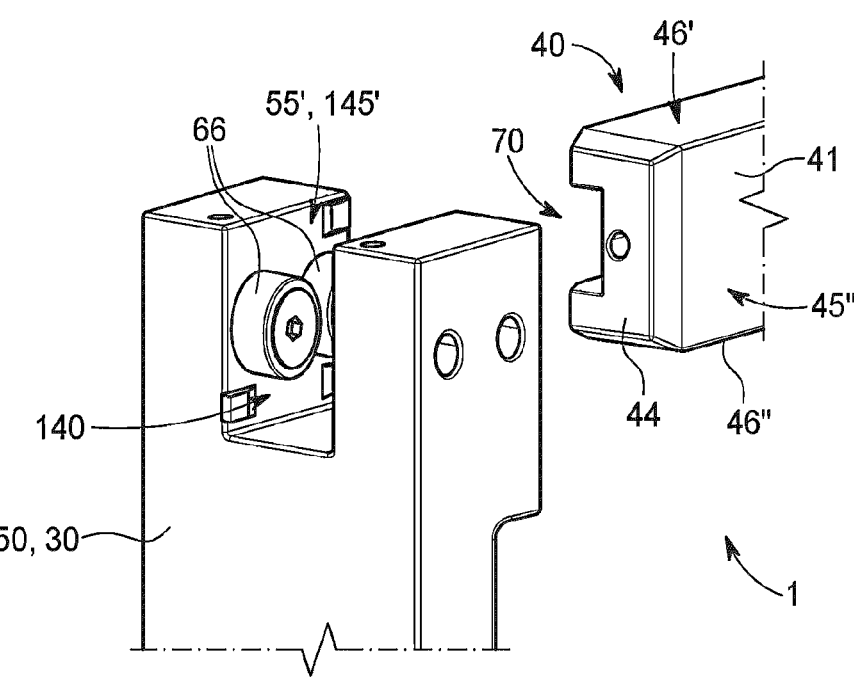
FIG. 9B, in a perspective view, shows the portion of a bearing and a half plate and a portion of a main guide rail pillar with an internal track according of FIG. 9A, in a situation where the bearing and main guide rail pillar are separated from each other.

As shown in e.g. FIGS. 8A-B and 9A-B, as also described above each main guide rail pillar 40 extends through a third opening 140 formed through a bearing 50 arranged between each main guide rail pillar 40 and the second mold plate 30. In FIGS. 8A-B and 9A-B, the bearing 50 is shown in perspective, from two different sides of the rectangular main guide rail pillar 40, respectively. FIGS. 8B and 9B shows the main guide rail 30, bearing 50 and second mold plate 30 in an assembled state, where the bearing 50 is slideably arranged on/connected to the main guide rail pillar 40. FIGS. 8B, 9B shows the same as FIGS. 8A, 9A, respectively, but where the main guide rail 30 is disassembled from the bearing 50 and the second mold plate 30.

A protruding bearing element 60 extends from the third opening 140 formed in the bearing 50 and into the guide track 70. The protruding bearing element 60 is connected to a bearing element 51 of the bearing 50 or to the second mold plate 30. As shown in FIGS. 8-11, the protruding bearing element 60 may be formed by two parallelly arranged rollers 66. Other embodiments of the protruding bearing element 60 will be described below in connection with FIGS. 12-13.

Regardless, the protruding bearing element 60 forms a bearing contact against the first guide surface 71 of the guide track 70.

As shown in FIGS. 8-9, the main guide rail pillar 40 extends through a third opening 140 through a bearing 50, which may be arranged in a second opening 130 formed through the second mold plate 30, in the same manner as described previously. Thus, in such embodiments, the bearing 50 comprises a separate bearing unit, having a bearing element 51 which is separate from the second mold plate 30. However, in other embodiments, at least some portions of the bearing 50 arranged between the main guide rail pillar 40 and the second mold plate 30 may be connected directly to portions of the second mold plate 30. For example, the protruding bearing element 60 may be connected directly to the second mold plate 30.

The rectangular cross sectional shape of the main guide rail pillar 40 may comprise equal side lengths, i.e. the cross sectional shape is square. However, as also described above, and in order to reduce the risk tilting of the second mold plate 30 relative to the main guide rail pillar, the rectangular shape of the main guide rail pillar 40 is oriented such that a longer side of the rectangular shape extends vertically and a shorter side (relative to the vertical sides) of the rectangular shape extends horizontally.

The guide track 70 is preferably, and as shown in all of FIGS. 8-13, formed in a sidewall of the main guide rail pillar 40, which is a longer side of the rectangular shape of the cross-section of the main guide rail 40.

As mentioned and as shown in FIGS. 8-11, in some embodiment the protruding bearing element comprises a first roller bearing 65 configured for rolling on said first internal guide surface 71 of the guide track 70. The first roller bearing 65 may comprise one or more rollers 66, for example in the form of wheels, cylinders, balls, caterpillars or the like. In FIGS. 8-11 the first roller bearing 65 is provided by two rollers 66 in the form of wheels, configured for cooperation with the first internal guide surface 71, which is arranged horizontally as shown in FIGS. 8-11. Thereby, the first internal guide surface 71 of the guide track 70 and the first roller bearing 65 may carry the vertical forces on the second mold plate 30 and the main guide rail pillar 40.

It will be appreciated that is some embodiments, the protruding bearing element 60 may in addition to the first roller bearing 65 shown also comprise a comprise a second roller bearing configured for rolling on a second internal guide surface of the guide track 70. The second internal guide surface of the guide track 70 is arranged opposite to and facing the first internal guide surface 71 of the guide track 70. The second roller bearing may—as the first roller bearing 65—comprise one or more rollers, for example in the form of wheels, cylinders, balls, caterpillars or the like. This would provide an additional bearing contact between the main guide rail pillar 40 and the second mold plate 30 and prevent the two from movement in the vertical direction (Y-direction in FIGS. 10, 11, 13).

As an alternative to the one or more roller bearings 65 between the guide track 70 formed in the main guide rail pillar 40 and the protruding bearing element 60 connected to the second mold plate 30, sliding bearings may be provided. Examples of this will be described with reference to FIGS. 12 and 13.

Figure 12:
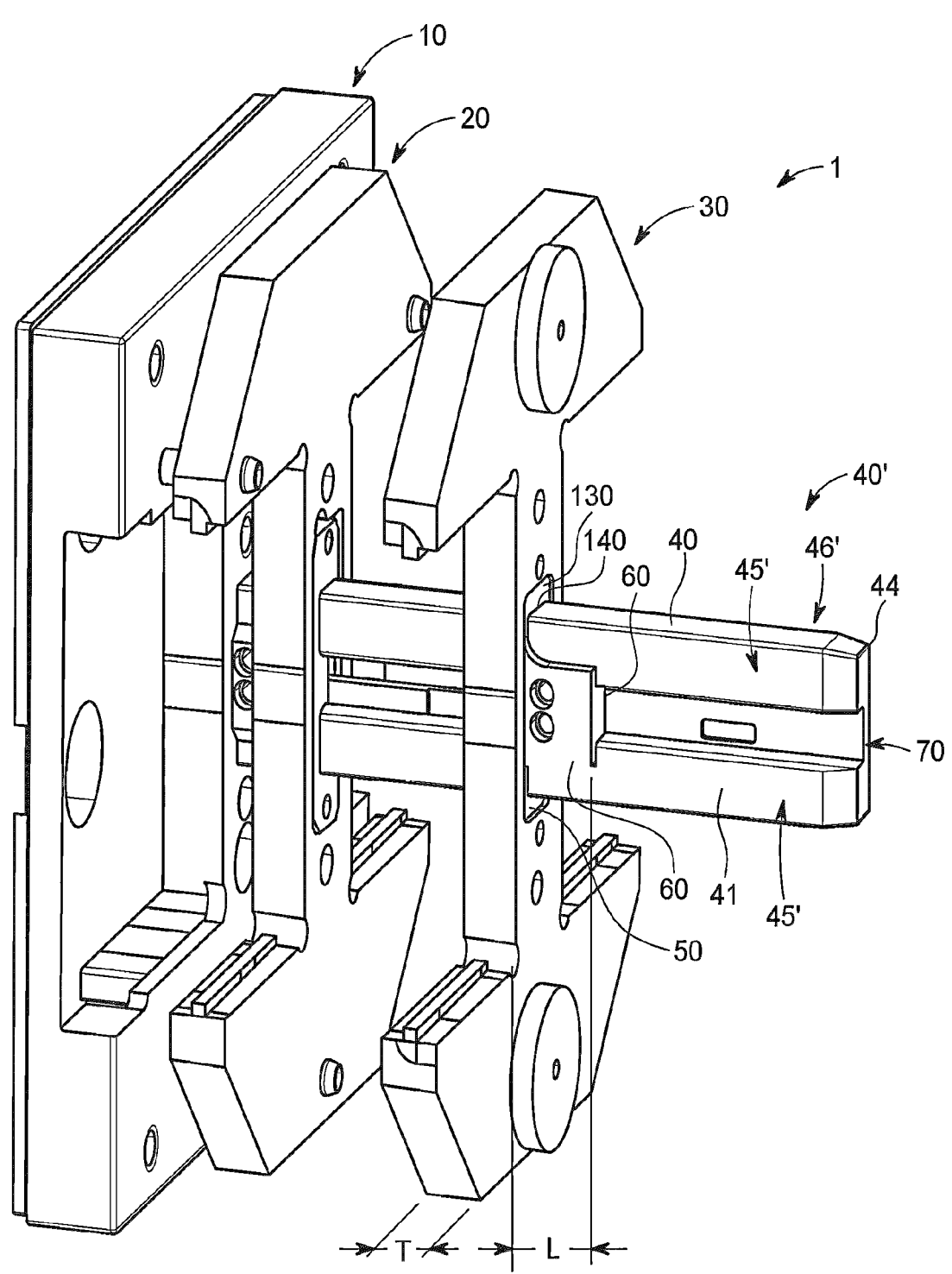
FIG. 12, in a perspective view, shows a mold with half plates and a rectangular main guide rail pillar with an internal track according to another embodiment of the disclosure.

In FIGS. 12 and 13, the protruding bearing element 60 is formed as a block of material extending from an internal sidewall/side surface of the third opening 140 through the bearing element 51 forming the bearing 50 between the main guide rail pillar and the second mold plate 30. The protruding bearing element 60 comprises a first external bearing surface 61 configured for sliding against the first internal guide surface 71 of the guide track 70.

In this case, as shown in the FIGS. 12 and 13, preferably, the first internal guide surface 71 of the guide track 70 and the first external bearing surface 61 are horizontally arranged. Thereby, the first internal guide surface 71 of the guide track 70 and the first external bearing surface 61 may carry the vertical forces on the second mold plate 30.

As it is also shown in FIGS. 12 and 13, the protruding bearing element 60 is formed as a block of material extending from an internal sidewall/side surface of the third opening 140 through the bearing element 51 may—in some embodiments additionally or alternatively comprise a second external bearing surface 62 arranged opposite to and facing away from the first external bearing surface 61. Also, the guide track 70 in this instance comprises at least a second internal guide surface 72, which is arranged opposite to and facing the first internal guide surface 71 of the guide track 70. The second external bearing surface 62 is configured for sliding against said second internal guide surface 72 of the guide track 70.

This would provide an additional bearing contact between the main guide rail pillar 40 and the second mold plate 30 and lock the two against movement in the vertical direction.

We note that in as shown and described above, a length, L, of the bearing 50 in the direction along the longitudinal axis, A, coincides with a thickness, T, (illustrated in FIG. 12)

of the second mold plate 30. Thus, the ends of the bearing element 50 in such embodiments are flush with the first and second surface 32, 33 of the second mold plate 30.

However, in some embodiments, and as shown in FIG. 12, the bearing element 51 may be provided with a flange 80 extending in the direction along the longitudinal axis, A, and protruding away from the second surface 33 of the second mold plate 30, such that a length of the protruding bearing element 60 and thereby the length of the first and/or second external bearing surfaces 61, 62, may be elongated relative to the previously described embodiment. This will allow to increase the stiffness of the connection between the main guide rail pillar 40 and the second mold plate 30 along the longitudinal axis A, and to thereby counteract torsion/rotation about the X-direction indicated in FIG. 13, i.e. reduce the lock effect described in connection with FIG. 14 above.

We note that even though, such an elongation of the protruding bearing element 60 has been described in connection with a sliding bearing, such as shown in FIGS. 12 and 13, a similar elongation of the protruding bearing element 60 may be provided in cases—as described above—with first and/or second roller bearings 65.

Thus, more generally speaking, the protruding bearing element 60 may have a length, L, which is longer than a thickness, T, of the second mold plate 30.

In general, the relationship between the length, L, of the protruding bearing element 60 and the thickness, T, of the second mold plate 30 is adapted to reduce the lock effect. The guide track 70 as such and in particularly in combination with either additional guide surfaces and/or an increased length L of the bearing, allows thinner mold plates 30 (reduction of T), and thereby to reduce the weight of mold boxes 1.

In one embodiment, the length, L, of the protruding bearing element 60 is twice the thickness, T, of the second mold plate 30.

Above, the bearing connection between the protruding bearing element 60 and the guide track 70 has been described.

In addition thereto it is possible to provide further bearing connections between the outer surfaces of the main guide rail pillar 40 and internal surfaces of the third opening 140 formed through the bearing element 51. This will increase the relative stability of the connection between the main guide rail pillar 40 and the second mold plate 40.

Thus, in some embodiments the bearing 50 further comprises a first internal bearing component 55', 55", 56', 56" arranged in the third opening 140, which is provided through the bearing 50, wherein the first internal bearing component 55', 55", 56', 56" is configured to cooperate with one of the planar guide surface 45', 45", 46', 46" of the main guide rail pillar 40. The first internal bearing component 55', 55", 56', 56" may be a roller bearing comprising one or more rollers 66, for example in the form of wheels, cylinders, balls, caterpillars or the like. In other embodiments the first internal bearing component 55', 55", 56', 56" may be a sliding bearing.

In a preferred embodiment, at least the first internal bearing component 55' of the bearing 50 cooperates with a first planar guide surface 45', 45", which is perpendicular to the first guide surface 71 of the guide track 70. Thereby the bearing provides support in the horizontal plane.

In one embodiment thereof, the first internal bearing component 55' comprises a first internal bearing surface 145' configured for sliding against the planar guide surface 45', of the main guide rail pillar 40. This is shown in FIG. 11 and in FIG. 13. Alternatively, the first internal bearing component 55' may comprise a roller bearing connection (not shown).

In a further embodiment the bearing 50 may additionally comprises a second internal bearing component 55" arranged in the third opening 140 through the bearing 50. The second internal bearing component 55" is configured to cooperate with another one of the planar guide surfaces, second planar guide surface 45" of the main guide rail pillar 40. The second planar guide surface 45" is also perpendicular to the first guide surface 71 of the guide track 70. The second internal bearing component 55" is arranged opposite to and facing the first internal bearing component 55'. Thereby, the second mold plate 30 is prevented from movement relative to the main guide rail pillar 40 in the horizontal direction (along X in FIG. 13).

In one embodiment hereof, the second internal bearing component 55" comprises a second internal bearing surface 145" configured for sliding against the second planar guide surface 45" of the main guide rail pillar 40, as shown in FIG. 11 and FIG. 13. Alternatively, the second internal bearing component 55" may comprise a roller bearing connection (not shown).

In some further embodiments, the bearing 50 may further comprise a third internal bearing component 56' arranged in the third opening 140 through the bearing 50. The third internal bearing component 56' is configured to cooperate with another one of the planar guide surfaces 46' of the main guide rail pillar 40, which is parallel to the first guide surface 71 of the guide track 70. This may support the bearing connection between the main guide rail pillar 40 and the second mold plate 30 in the same direction as the bearing contact between the protruding bearing element 60 and the first guide surface 71 of the guide track 70.

In an embodiment hereof, the third internal bearing component 56' comprises a third internal bearing surface 146', 146" configured for sliding against the third planar guide surface 46' of the main guide rail pillar 40, as shown in FIG. 13. Alternatively, the third internal bearing component 56' may comprise a roller bearing connection (not shown).

Additionally, in a further embodiment, the bearing 50 may comprise a fourth internal bearing component 56", also arranged in the third opening 140 through the bearing 50. The fourth internal bearing component 56" is configured to cooperate with a fourth planar guide surfaces 46" of the main guide rail pillar (40), which is parallel to the third planar guide surfaces 46' and facing in the opposite direction thereto. This may prevent the bearing connection between the main guide rail pillar 40 and the second mold plate 30 from movement in the same direction as the bearing contact between the protruding bearing element 60 and the first guide surface 71 of the guide track 70, i.e. the vertical direction, which is the Y-direction in FIG. 13.

In an embodiment hereof, the fourth internal bearing component 56" comprises a fourth internal bearing surface 146" configured for sliding against the fourth planar guide surface 46" of the main guide rail pillar 40 as shown in FIG. 13. Alternatively, the fourth internal bearing component 56" may comprise a roller bearing connection (not shown).

We note that in any of the embodiments where the main guide rail pillar 40 is described with a guide track (FIGS. 8-13), the main guide rail system 40' of the mold box 1 may comprises a first main guide rail pillar 40, and second main guide rail pillar 40, in the same manner as shown in FIG. 7, where each of the first and second main guide rail pillars 40 has a rectangular cross section perpendicular to the longitudinal axis, A.

Thus, in further embodiments thereof, the first main guide rail pillar 40 extends through an opening 130 in the second mold plate 30, where said opening 130 through the second mold plate 30 is formed centrally adjacent to an upper edge 34 of the second mold plate 30, and the second main guide rail pillar 40 extends through another opening 130 in the second mold plate 30, which opening is formed centrally adjacent to a lower edge 35 of the second mold plate 30.

However, alternatively, the main guide rail system 40' of the mold box 1 comprises a single main guide rail pillar 40 only, such as shown in FIGS. 3-6. In this case, preferably, the single main guide rail pillar 40 extends through a second opening 130 in the second mold plate 30, which said opening 130 through the second mold plate 30 is formed centrally in the second mold plate 30.

As is also apparent from the above description, the mold box 1 according to the disclosure may be utilized in an injection molding machine as discussed above. Thus in a further aspect the disclosure relates to an injection molding machine 200 comprising a mount 201;

a mold box 1 according to any one of the embodiments disclosed above;

a linear drive mechanism 280 for moving the second mold plate 30; and an injection part 210, wherein the second mold plate 30 is movably arranged relative to the first mold plate 20, and driven by the linear drive mechanism 280.

Where, in the FIGS. 3-5 embodiments the first and second mold plates 20, 30 are rectangular or quadratic in shape, the first and seconds mold plate 20, 30 as well as the base plate 10 in the FIG. 12 embodiment have more complex shapes. The bas plate 10 and the first and second mold plates 20, 30 show openings 16, 26, 36 wherein cassettes with runner channels, mold cavities and mold cores, respectively may be inserted sideways into holders of the plates.

It is to be noted that the figures and the above description have shown the example embodiments in a simple and schematic manner. Many of the specific mechanical details have not been shown since the person skilled in the art should be familiar with these details and they would just unnecessarily complicate this description.

LIST OF PARTS

1 mold box
10 base plate
20 first mold plate
21 mold cavity formed in a first mold plate
22 first surface of the first mold plate 20
23 second surface or side of the first mold plate, opposite to the first surface, and facing the base plate,
24 openings provided in the first mold plate for receiving main guide rails
30 second mold plate
31 core, mold core
32 first surface of the second mold plate, facing the first surface of the first mold plate
33 second surface of the second mold plate facing away from the first mold plate and the base plate, and arranged opposite to the first surface of the second mold plate
34 upper edge of the second mold plate
35 lower edge of the second mold plate
40 main guide rail pillar, elongate main guide rail pillar
41 elongate, main body part of main guide rail pillar,

42 flange or protrusion of main guide rail pillar having a larger cross sectional extent than that of the main body part, and formed at first end of main guide rail pillar
43 first end of main guide rail pillar
44 second end of main guide rail pillar, opposite to first end
45' planar guide surface, first planar guide surface of main guide rail pillar
45" planar guide surface, second planar guide surface of main guide rail pillar
46' planar guide surface, third planar guide surface of main guide rail pillar
46" planar guide surface, fourth planar guide surface of main guide rail pillar
50 bearing arranged between main guide rail pillar and the second mold plate
51 bearing element arranged between main guide rail pillar and the second mold plate
55 first internal bearing component of the bearing and arranged in the third opening through the bearing
60 protruding bearing element of the bearing arranged between main guide rail pillar and the second mold plate
61 first external bearing surface of the protruding bearing element
62 second external bearing surface of the protruding bearing element
65 first roller bearing
66 roller
70 guide track formed in a sidewall of the main guide rail pillar
71 first internal guide surface of the guide track
72 second internal guide surface of the guide track formed opposite to and facing the first internal guide surface of the guide track
73 third internal guide surface of the guide track
100 molded object
105 plastic granules
120 opening, first opening, formed through the first mold plate
130 opening, second opening, formed through the second mold plate, and for receiving main guide rail pillar
140 third opening formed through the bearing 50
200 injection molding machine
201 mount of injection molding machine
210 injection part of injection molding machine
220 reciprocating screw
225 nozzle
226 sprue channels in base plate
230 drive mechanism for rotating reciprocating screw
240 hopper
250 heating devices surrounding the reciprocating screw
260 barrel of a reciprocating screw of the injection part
270 clamping part of injection molding machine
280 linear drive mechanism
290 moveable platen
400 cylindrical main guide rails
A longitudinal axis of main guide rail pillar
L length of the protruding bearing element
T thickness of the second mold plate

The invention claimed is:

1. A mold box for an injection molding machine, the mold box comprising:

a first mold plate;

a second mold plate movably arranged relative to the first mold plate along a longitudinal axis; and a main guide rail system configured for guiding at least the second mold plate linearly away from and towards the first mold plate, wherein the main guide rail system comprises a main guide rail pillar, having a rectangular cross section perpendicular to the longitudinal axis, wherein the main guide rail pillar extends through a third opening through a bearing arranged between the main guide rail pillar and the second mold plate;

wherein a guide track is formed as an elongate indention in a sidewall of the main guide rail pillar and comprising a first internal guide surface; and wherein a protruding bearing element extends from the third opening in the bearing and into the guide track, and forming a bearing contact against the first guide surface of the guide track.

2. The mold box according to claim 1, wherein the rectangular shape of the main guide rail pillar is oriented such that a longer side of the rectangular shape extends vertically and a shorter side of the rectangular shape extends horizontally.

3. The mold box according to claim 1, wherein the guide track is formed in a sidewall of the main guide rail pillar which is a longer side of the rectangular shape of the cross-section of the main guide rail.

4. The mold box according to claim 1, wherein the protruding bearing element has a length which is longer than a thickness of the second mold plate.

5. The mold box according to claim 1, wherein the protruding bearing element comprises a first roller bearing configured for rolling on said first internal guide surface of the guide track.

6. The mold box according to claim 1, wherein the protruding bearing element comprises a first external bearing surface configured for sliding against said first internal guide surface of the guide track.

7. The mold box according to claim 6, wherein the guide track comprises at least a second internal guide surface arranged opposite to and facing the first internal guide surface, and wherein the protruding bearing element comprises a second external bearing surface configured for sliding against said second internal guide surface of the guide track.

8. The mold box according to claim 1, wherein the bearing further comprises a first internal bearing component arranged in the third opening through the bearing, wherein the first internal bearing component is configured to cooperate with one planar guide surface of the main guide rail pillar.

9. The mold box according to claim 8, wherein the first internal bearing component of the bearing cooperates with a first planar guide surface, which is perpendicular to the first guide surface of the guide track.

10. The mold box according to claim 9, wherein the bearing further comprises a third internal bearing component arranged in the third opening through the bearing, wherein the third internal bearing component is configured to cooperate with another one of the planar guide surfaces of the main guide rail pillar, which is parallel to the first guide surface of the guide track.

* * * * *